UNITED STATES PATENT OFFICE.

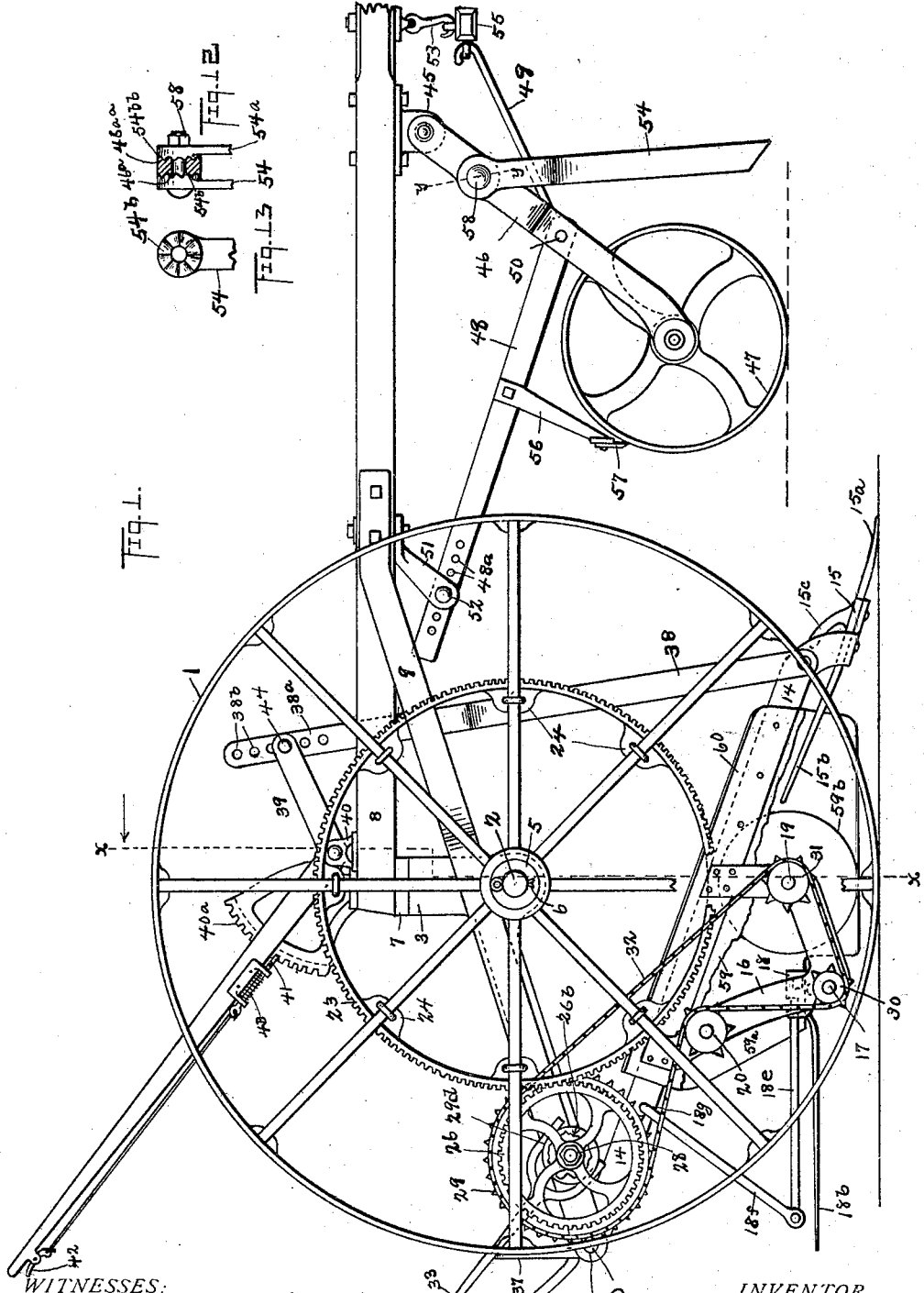

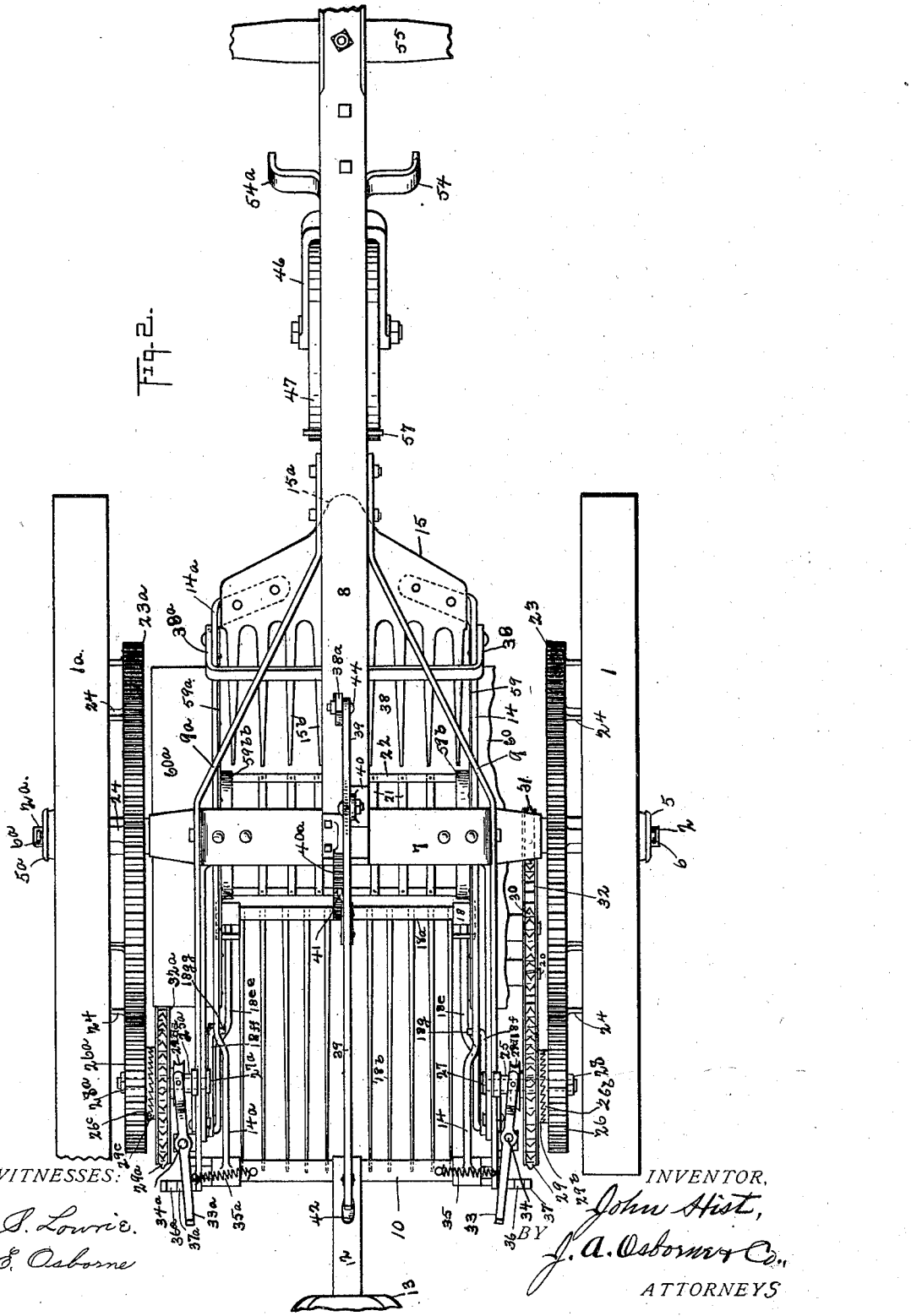

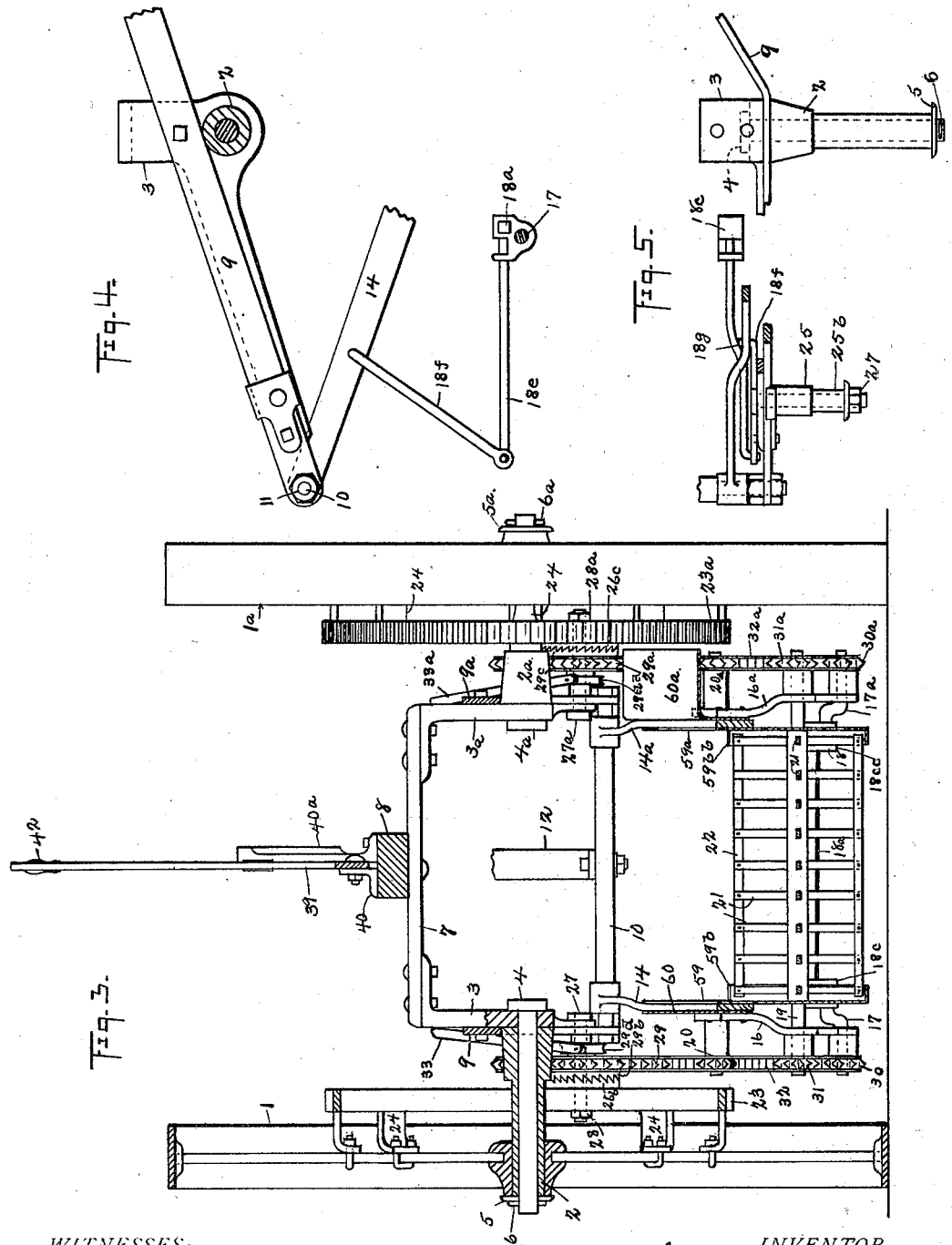

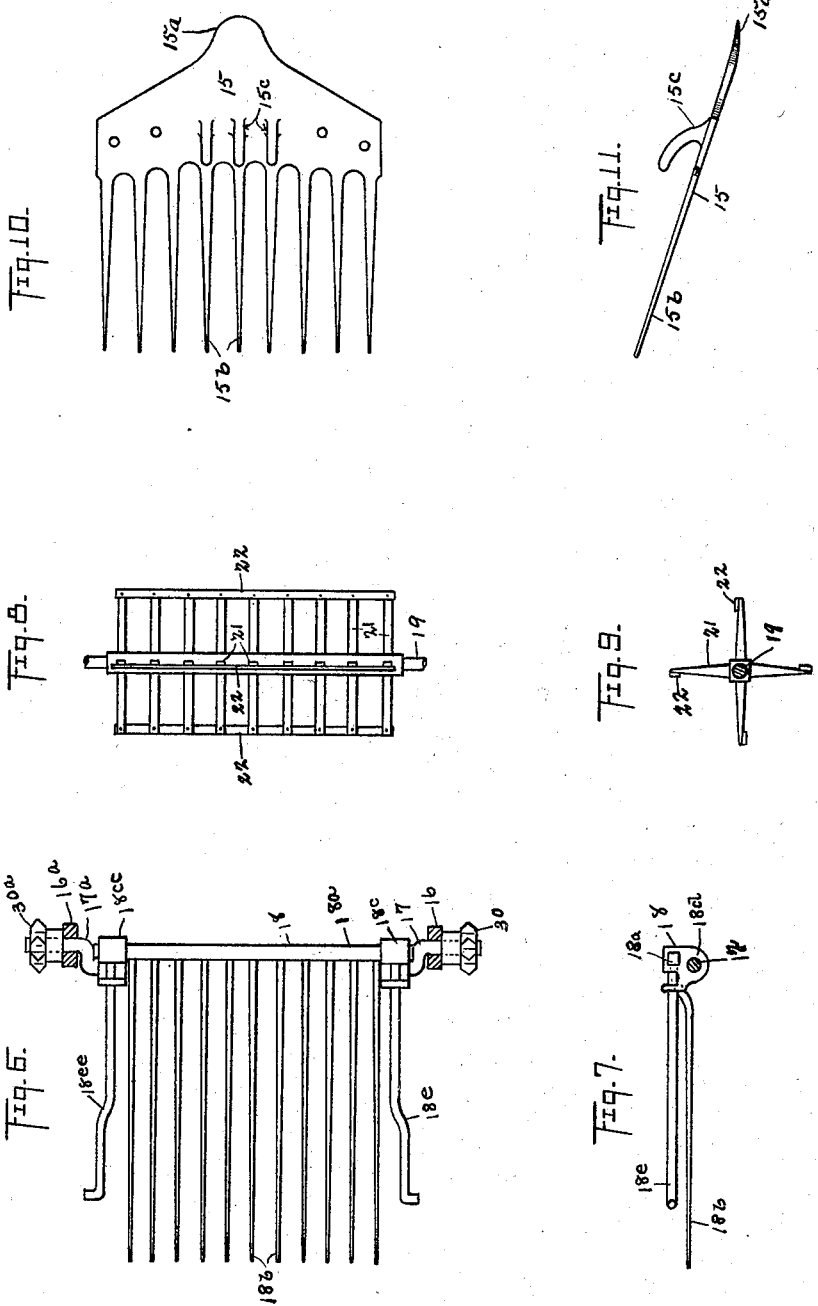

JOHN HIST, OF RANDALL, OHIO.

POTATO-DIGGER.

SPECIFICATION forming part of Letters Patent No. 625,766, dated May 30, 1899.

Application filed February 4, 1897. Serial No. 622,059. (No model.)

*To all whom it may concern:*

Be it known that I, JOHN HIST, a citizen of the United States, residing at Randall, in the county of Cuyahoga, State of Ohio, have invented certain new and useful Improvements in Potato-Diggers, of which the following, with the accompanying drawings, is a full, clear, and an exact specification.

The present potato-diggers are impracticable in use because of the fact that the tops or the vines of the potatoes gather and clog up the machines, the vines will not pass through the machines, and the machines will not separate the potatoes from the earth.

The object of my invention is an improved potato-digger that will avoid these difficulties.

My invention consists in the means herein described and claimed for arranging the potato-tops and also the improved means described and claimed for separating the potatoes from the earth and in the combination of the several parts herein described.

In the drawings, Figure 1 is a side elevation of a machine embodying my improvements. Fig. 2 is a plan thereof, and Fig. 3 is a cross-section of Fig. 1 on line $x\,x$. Fig. 4 is a side elevation of the side frames, and Fig. 5 is a plan thereof. Fig. 6 is a plan of the shaker, and Fig. 7 is a side view thereof. Fig. 8 is a plan of the reel, and Fig. 9 is an end view thereof. Fig. 10 is a plan of the plow, and Fig. 11 is a side elevation thereof. Fig. 12 is a section on the line $y\,y$ of Fig. 1.

In the several figures of the drawings like reference characters refer to like parts.

1 $1^a$ are traction-wheels that revolve upon the spindles 2 $2^a$. These spindles project laterally from the side frames 3 $3^a$ and are held in position by the bolts 4 $4^a$, that pass through the spindle and have washers 5 $5^a$ outside the wheel-hubs and split pins 6 $6^a$ or nuts screwed thereon to keep the traction-wheels in place on their spindles. The side frames are secured together by a cross-piece 7, that is secured to the upper ends of the side frames. The side frames are approximately L-shaped, as illustrated. The tongue 8 is fixed to the cross-piece 7. Braces 9 $9^a$ have their front ends attached to the sides of the tongue 8. They incline outwardly until they reach approximately a vertical plane with the cross-piece 7, from which point they extend backwardly in parallel lines and are secured to the outer sides of the side frames 3 $3^a$ by means of bolts or otherwise. These braces give great strength and rigidity to the machine. A shaft or cross-bar 10 is carried in the holes 11 in the back ends of the braces 9 $9^a$. The shaft 10 has no rotary movement. Upon it is fixed the seat-arm 12, that carries the seat 13. Hinged upon the shaft 10 are main arms 14 $14^a$, that incline forwardly and carry the plow, reel, and the shaker. The front ends of the main arms project laterally inwardly under the edge of the plow 15, to which lateral projections the plow is firmly attached by bolts or otherwise. This holds the front ends of the main arm fixed relatively to each other.

The plow is preferably of the form illustrated by Figs. 10 and 11, having a projecting nose-piece $15^a$, backwardly-projecting fingers $15^b$, and breakers $15^c$ attached to the upper side of the plow-shovel at its central part to break the earth as it is forced back over the plow. The breakers are metal tongues or lugs that project upwardly and backwardly from the upper face of the plow and are approximately of the form illustrated. Either one or more of these breakers may be employed. The drawings show three of them, which is believed to be the preferable number. Irregular U-shaped hangers 16 $16^a$ are attached to the main arms 14 $14^a$ at the sides of the machine, which hangers carry the stub crank-shafts 17 $17^a$, through which are operated the front end of the shaker 18, the reel-shaft 19, and the idlers 20 $20^a$. Radiating from the shaft 19 are arms 21, whose outer ends are connected by the cross-pieces 22. The shaft 19, radiating arms 21, and cross-pieces 22 constitute the reel. The reel-shaft is journaled in the U-hangers 16 $16^a$, and the stub crank-shafts 17 $17^a$, that operate the shaker, are journaled in the U-frames. At the inner sides of the traction-wheels are gear-wheels 23 $23^a$. They are secured to the spokes of the traction-wheel by the lateral arms 24 24. The gear-wheels 23 $23^a$ radiate with the traction-wheels. Attached to the outer sides of the side frames 3 $3^a$, back of the traction-wheel spindles, are hollow sleeves 25 $25^a$, having reduced portions $25^b$, that form spindles for the gear-wheels 26 $26^a$, that mesh with the gear-wheels 23 $23^a$. The hollow sleeves 25 $25^a$ are held in place by bolts 27 27ª, that pass through said sleeves and have nuts 28 28ª screwed on the outer ends thereof to keep the gears 26 26ª in place. Upon the sleeves 25 25ª turn sprocket-wheels 29 29ª. The sprocket-wheels 29 29ª have a lateral movement upon their sleeves and on their outer hub-faces have a box-clutch formation 29$^b$ 29$^c$, adapted to engage a like box-clutch formation 26$^b$ 26$^c$ on the inner sides of the gear-wheels 26 26ª. On the outer ends of the stub-shafts 17 17ª are fixed sprocket-wheels 30 30ª, and on the ends of the reel-shaft 19 are fixed sprocket-wheels 31 31ª. Drive-chains 32 32ª travel around said sprocket-wheels 29 31 30 and idler 20 and around the sprocket-wheels 29ª 31ª 30ª and idler 20ª. As the machine travels forward with the clutch mechanism described in engagement power is transmitted from the traction-wheels through their connected gears 23 23ª, the intermediate gears 26 26ª, the sprocket-wheels 29 29ª, and the chains 32 32ª to the sprocket-wheels 31 31ª and 30 30ª, that drive the reel and the shaker. The shaker consists of the cross-bar 18ª, having projecting forwardly therefrom the slats or fingers 18$^b$. Castings 18$^c$ 18$^{cc}$ at the ends of the shaft 18ª receive said shaft, and also have bearings 18$^d$ for the stub-shafts 17 17ª, and said castings also form holders for the shaker-arms 18$^e$ 18$^{ee}$. Hangers 18$^f$ 18$^{ff}$ are attached to the back ends of the shaker-arms 18$^e$ 18$^{ee}$ and have a pivotal connection with the side arms 14 14ª by means of bolts 18$^g$ 18$^{gg}$. To provide for throwing the clutch already described in and out of connection, the levers 33 33ª are pivoted at 34 34ª to the sides of the brace 9 9ª and have yoked ends that enter grooves 29$^d$ 29$^{dd}$ in the elongated hubs of the sprocket-wheels 29 29ª. To hold said clutches in operative connection, springs 35 35ª are attached to said levers 33 33ª and the cross-piece 10. Normally when working the levers are in the position shown and the clutches in operative connection. When the machine is not in operation, the levers are thrown outwardly and engage in notches 36 36ª in the plates 37 37ª. These levers may be operated by the feet of the operator when riding in position on the machine and may be operated by hand, if desired. Pivotally connected with the front ends of the main arms 14 14ª, immediately above the plow connection, is a yoke 38, whose stem 38ª projects upwardly through a slot in the tongue. This yoke provides for raising and lowering the plow and adjusting it to different depths of penetration in the earth. A bent lever 39 is pivoted to the bracket 40 on top of the tongue 8, the short end of the lever having a pivotal connection with the stem 38ª of the yoke 38. The bracket 40 is provided with a notched segment 40ª, and the lever 39 carries a spring-latch 41, that is operated by the lever 42 and held in place by the spring 43, as shown. The lever 39 and its spring-latch provide for raising and lowering the plow and holding it in a fixed position. Adjustment of the connection between the lever 39 and the stem 38ª of the yoke 38 is provided by means of the pin 44 passing through holes 38$^b$.

To the under side of the tongue, in the front of the attachment of the braces 9 9ª, is a bracket 45, to which is pivoted a yoke 46. This yoke carries a tread-wheel 47 in its forked end. Between the arms of the yoke 46, at the junction of its arms with its stem, are pivoted the brace 48 and the lever 49 by means of the pin 50. The brace 48 extends backwardly and has a pivotal connection with the hanger 51 by means of the pin 52, that passes through one of the holes 48ª in said lever 48. A series of holes 48ª in said lever provides for adjusting the height of the wheel 47. The lever 49 is connected with the swinging hanger 53 and has a hook 49ª at its front end, to which is attached the doubletree 55. The pull of the machine is on the lever 49 and the brace 48. Suspended from the brace 48 is a hanger 56, that has a blade 57 attached to its lower end for scraping the face of the wheel 47 and keeping it clean. Attached to the sides of the stem of the yoke 46 are downwardly-projecting arms 54 54ª. These arms constitute potato-top straighteners. They have adjustment upon the yoke 46 by means of the serrated meeting faces 46ª 46ªª and 54$^b$ 54$^{bb}$ and the bolt 58.

To prevent potato-tops from winding around the ends of the reel and to keep the potatoes and tops in place in their passage through the machine, I provide two shields 59 59ª, that are attached to the inner sides of the main arms 14 14ª and extend from near the central portion of the plow backwardly past the front end of the shaker. Upon the inside of the shields 59 59ª are annular flanges 59$^b$ 59$^{bb}$, that project inwardly and overlap the ends of the reel and prevent potato-tops from getting between the ends of the reel and the shields. To prevent the potato-tops from falling over upon the drive-chains 32 32ª and their sprockets, shields 60 60ª are attached to the outer sides of the main arms 14 14ª and project laterally out over said chains.

In the operation of my machine the traction-wheels run between the rows of potatoes where the ground is depressed, the top-straighteners 54 54ª are dragged along by the sides of the row in the direction of the travel of the machine, and the tread-wheel 47 follows and presses the tops down flat, so as to prevent their spreading out. The plow follows immediately behind the tread-wheel and enters the earth below the row of potatoes, plowing the earth up. As the earth passes backwardly over the plow the earth-breakers 15$^c$ break the earth up. The tongues on the plow, further, serve to break the earth up and allow the finer earth to fall through, and the larger particles of earth, with the potatoes and their tops, pass over the reel and back onto the shaker. In operation it has been found that the means I have employed for arranging the potato-tops in advance of the plow and the interposition of the reel between the plow and the shaker, with the shields described, carries the potato-tops back through the machine without any clogging and completely separates the potatoes from the earth and accomplishes the object of my invention.

What I claim as my invention, and desire to secure by Letters Patent, is—

1. In a potato-digger, in combination with the tongue thereof, a pivoted yoke, a brace extending backwardly from the pivoted yoke, a hanger with which said backwardly-extending brace is adjustably connected, and downwardly-projecting arms adjustably connected with the pivoted yoke, substantially as described.

2. In a potato-digger, the combination of side frames, spindles carried by the side frames, traction-wheels upon said spindles, a cross-beam fixed to the tops of said side frames, a tongue connected with said cross-piece, side braces extending from the sides of the tongue backwardly past the spindles of the traction-wheels, main arms hinged to the said side braces, a plow fixed to the front ends of the main arms, a shaker suspended from the main arms, and a reel interposed between the plow and the shaker, said reel being carried by the main arm, and operative mechanism for the shaker and the reel, substantially as described.

3. In a potato-digger, the combination of hinged main arms, a plow fixed to the front end of the main arms, a shaker suspended from the main arms, a reel interposed between the plow and the shaker, a pivoted yoke carrying a tread-wheel, a brace extending backwardly from the pivoted yoke, a hanger with which said backwardly-extending lever is adjustably connected, and arms adjustably attached to said pivoted yoke for arranging the tops of potatoes, substantially as described.

4. In a potato-digger, a plow, a shaker, a reel interposed between the plow and the shaker, and shields on either side of the reel having lateral flanges that project over the ends of the reel, substantially as described.

In testimony whereof I affix my signature, in the presence of two witnesses, this 29th day of January, 1897.

JOHN HIST.

Witnesses:
  J. A. OSBORNE,
  DANIEL HIST.